(12) United States Patent
Miyamoto

(10) Patent No.: US 7,261,434 B2
(45) Date of Patent: Aug. 28, 2007

(54) BACKLIGHT APPARATUS, AND A LIQUID CRYSTAL DISPLAY (LCD) THEREWITH

(75) Inventor: Hirofumi Miyamoto, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/228,994

(22) Filed: Sep. 16, 2005

(65) Prior Publication Data

US 2006/0061706 A1    Mar. 23, 2006

Related U.S. Application Data

(62) Division of application No. 10/307,910, filed on Dec. 2, 2002, now Pat. No. 6,960,001.

(30) Foreign Application Priority Data

Dec. 28, 2001 (JP) ............................. 2001-399592

(51) Int. Cl.
*F21V 29/00* (2006.01)
*F21K 2/00* (2006.01)

(52) U.S. Cl. .................. 362/218; 362/294; 362/580; 362/614; 362/634

(58) Field of Classification Search ............... 362/218, 362/580, 611, 614, 630–634, 294, 373; 349/70, 349/161
See application file for complete search history.

(56) References Cited

U.S. PATENT DOCUMENTS

| | | | | |
|---|---|---|---|---|
| 2,413,505 A | | 12/1946 | Kilduff et al. ............... 362/225 |
| 3,035,419 A | * | 5/1962 | Wigert ......................... 362/218 |
| 4,487,481 A | | 12/1984 | Suzawa ......................... 349/67 |
| 4,503,360 A | | 3/1985 | Bedel .......................... 315/112 |
| 4,659,183 A | | 4/1987 | Suzawa ......................... 349/67 |
| 4,947,475 A | | 8/1990 | Bright ......................... 362/343 |
| 5,098,179 A | | 3/1992 | Turner ......................... 349/58 |
| 5,188,451 A | | 2/1993 | Shanks ......................... 362/223 |
| 5,299,038 A | * | 3/1994 | Hamada et al. ............. 349/161 |
| 5,334,993 A | | 8/1994 | Okajima et al. ............ 345/102 |
| 5,450,292 A | | 9/1995 | Yokoyama et al. ......... 362/613 |
| 5,546,203 A | * | 8/1996 | Takao .......................... 349/62 |
| 5,619,351 A | | 4/1997 | Funamoto et al. ............ 349/61 |
| 6,066,920 A | | 5/2000 | Torihara et al. |
| 6,147,724 A | | 11/2000 | Yoshii et al. ................. 349/62 |
| 6,152,569 A | | 11/2000 | Aizawa ......................... 362/27 |
| 6,166,788 A | | 12/2000 | Ha et al. ....................... 349/58 |
| 6,231,202 B1 | | 5/2001 | Kozaka et al. .............. 362/614 |
| 6,286,971 B1 | | 9/2001 | Hori |
| 6,409,356 B1 | | 6/2002 | Nishimura ................... 362/632 |
| 6,417,832 B1 | * | 7/2002 | Skinner et al. ............... 349/58 |
| 6,441,874 B1 | | 8/2002 | Saito et al. |

(Continued)

FOREIGN PATENT DOCUMENTS

EP        971 258        1/2000

(Continued)

*Primary Examiner*—Alan Cariaso
(74) *Attorney, Agent, or Firm*—Greer, Burns & Crain, Ltd

(57) ABSTRACT

Dissipation of heat generated by a luminescent source, such as a fluorescent lamp, of a backlight apparatus and an LCD therewith is enhanced by providing a proximity section in a holder, making the hottest part the closest to the holder for efficient heat conduction.

4 Claims, 20 Drawing Sheets

U.S. PATENT DOCUMENTS

| | | |
|---|---|---|
| 6,545,732 B2 | 4/2003 | Nakano |
| 6,590,626 B1 | 7/2003 | Suzuki et al. ............... 349/70 |
| 2002/0015297 A1* | 2/2002 | Hayashi et al. ............ 362/580 |

FOREIGN PATENT DOCUMENTS

| | | |
|---|---|---|
| JP | 2-311818 | 12/1990 |
| JP | 6-59131 | 3/1994 |
| JP | 6-202103 | 7/1994 |
| JP | 8-179318 | 7/1996 |
| JP | 10-333149 | 12/1998 |
| JP | 11-119216 | 4/1999 |
| JP | 11-212479 | 8/1999 |
| JP | 2000-30515 | 1/2000 |

* cited by examiner

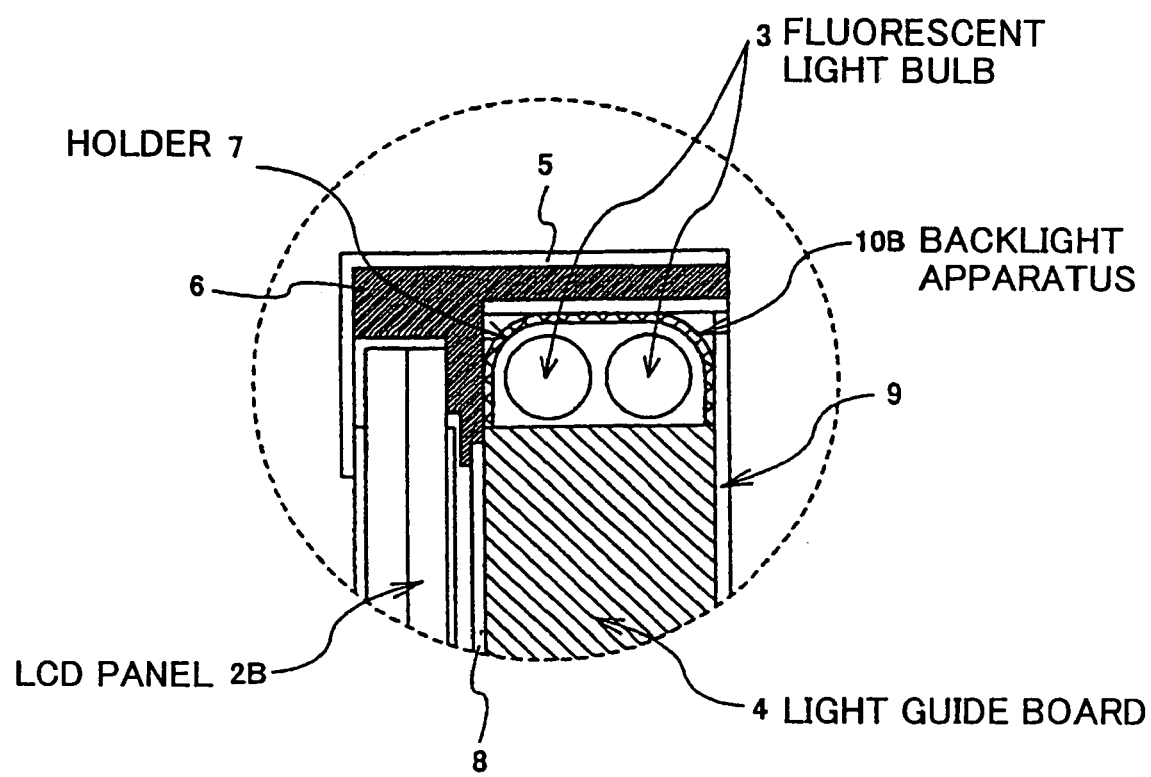

21B LIQUID CRYSTAL DISPLAY
20B BACKLIGHT APPARATUS
41 PROXIMITY SECTION
WIRING 33
27 HOLDER
40B FLUORESCENT LIGHT BULB ASSEMBLY

21C LIQUID CRYSTAL DISPLAY
20C BACKLIGHT APPARATUS
23A, 23B, 23C FLUORESCENT LIGHT BULB
27 HOLDER
40C FLUORESCENT LIGHT BULB ASSEMBLY

FIG.14
(A)
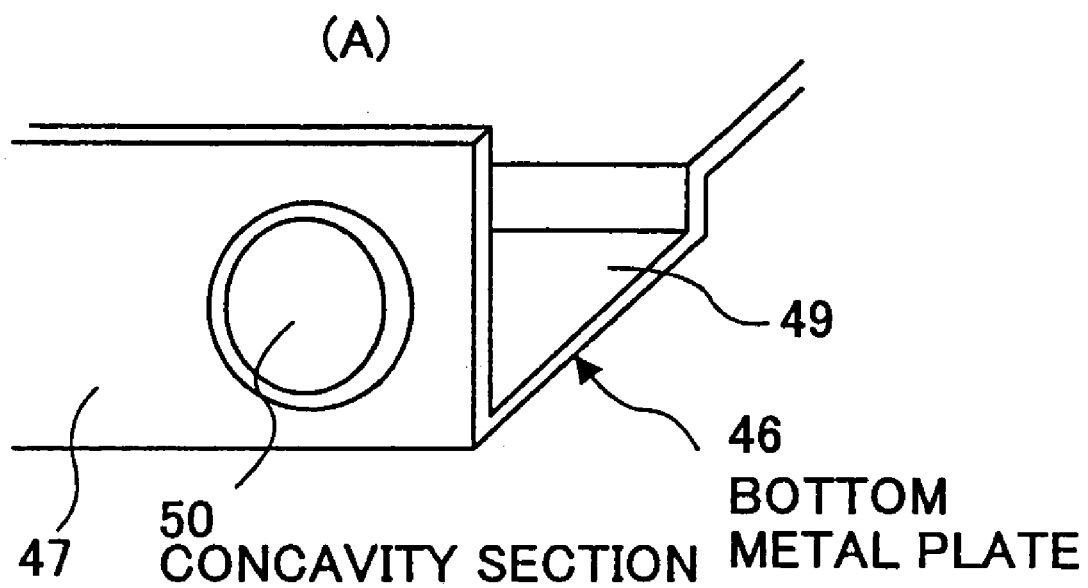
47  50 CONCAVITY SECTION  46 BOTTOM METAL PLATE  49
(B)
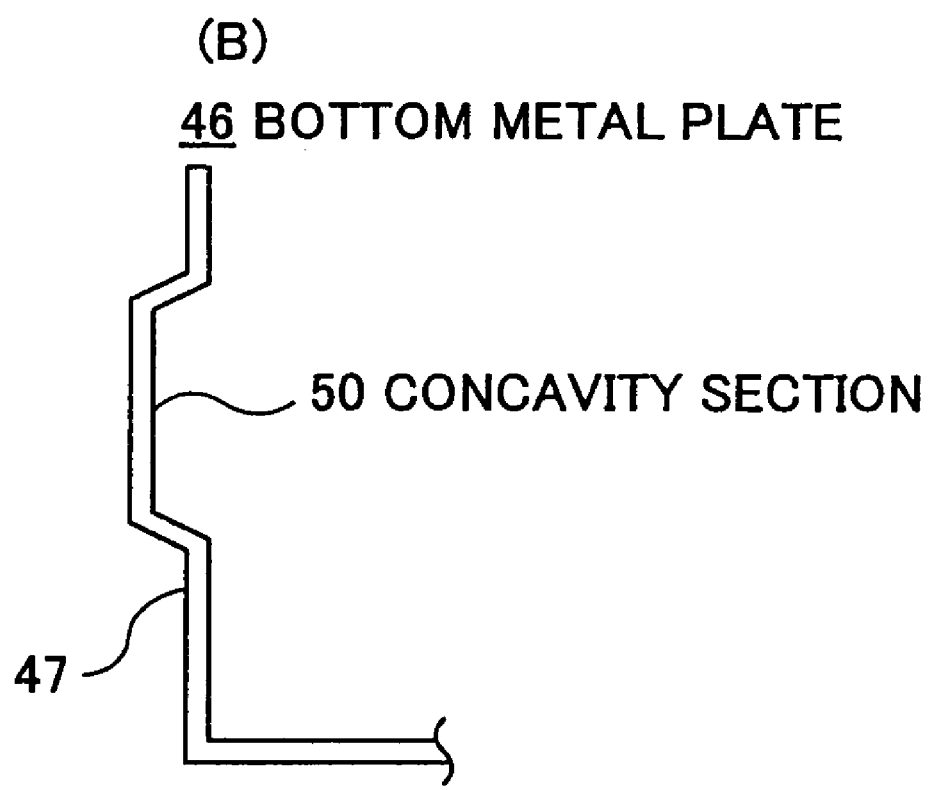
46 BOTTOM METAL PLATE
50 CONCAVITY SECTION
47

40H FLUORESCENT LIGHT BULB ASSEMBLY

40H FLUORESCENT LIGHT BULB ASSEMBLY

BACKLIGHT APPARATUS, AND A LIQUID CRYSTAL DISPLAY (LCD) THEREWITH

This is a divisional of U.S. patent application Ser. No. 10/307,910 filed Dec. 2, 2002 now U.S. Pat. No. 6,960,001.

BACKGROUND OF THE INVENTION

1. Field of the Invention

The present invention generally relates to a backlight apparatus, and a liquid crystal display (LCD), and especially relates to a backlight apparatus including a luminescent source that generates heat, such as a fluorescent lamp, and an LCD that employs the backlight apparatus.

Conventionally, CRT (cathode-ray tube) displays have been used. In recent years, use of thin displays that employ an LCD panel has been progressing. Display quality of the LCD has been enhanced, and enlargement and higher brightness of the displays are desired for television use, etc. With requirements of brighter LCDs increasing, demands are increasing for a backlight apparatus that can provide the illumination for the enlarged and brighter liquid crystal panel.

2. Description of the Related Art

Conventional LCDs have been used mainly by notebook PCs, when up to about 13 inch displays are the main thrust with a screen brightness of around 150 cd/m2 and a resolution of XGA. FIG. 1 and FIG. 2 show an LCD 1A that is an example of a conventional LCD.

The LCD 1A is configured with a liquid crystal panel 2A, a housing 5, a backlight apparatus 10A, etc. The housing 5 holds the liquid crystal panel 2A and the backlight apparatus 10A through a resin frame 6 and a backboard 9. Here, the backlight apparatus 10A gives predetermined brightness to a display of the liquid crystal panel 2A by illuminating the liquid crystal panel 2A from the back.

The backlight apparatus 10A generally includes a fluorescent light bulb 3 serving as a light source, a light guide board 4 that guides the light from the fluorescent light bulb 3 to the liquid crystal panel 2A, and a holder 7 that reflects the light from the fluorescent light bulb 3 to the light guide board 4, while supporting the fluorescent light bulb 3 via a rubber holder.

In the fluorescent light bulb 3, mercury is enclosed in Ar gas or Ne gas, and, on the wall of the fluorescent light bulb 3, a fluorescent material is applied. Mercury gas generates ultraviolet rays during electric discharge, and light is generated when the ultraviolet rays hit the fluorescent material.

The light guide board 4, made from acrylic resin, collaborates with an optical sheet 8 installed, and transmits the light from the fluorescent light bulb 3 and distributes the light all over the liquid crystal panel 2A. In the case of the LCD 1A that provides a relatively small screen size (about 13 inches), where no particularly high resolution and no particularly high screen brightness are required, the backlight apparatus 10A is provided only on one side of the light guide board 4, and only one fluorescent light bulb 3 is provided.

A larger screen size, 14 to 15 inches, has been used for the monitor of a desktop PC. FIGS. 3 and 4 show an LCD 1B that provides a relatively large screen size, for which resolution of SXGA and screen brightness of about 250 cd/m are required. For this reason, two backlight apparatuses 10B are installed in the LCD 1B, such that one of the backlight apparatuses is provided on each side of the light guide board 4. Further, each backlight apparatus 10B includes two fluorescent light bulbs 3. However, with infusion of DVD drives, users require that PC monitors provide even larger screens and higher brightness for movie viewing and so on.

In order to increase the screen size and brightness, there is a problem to solve. That is, the fluorescent light bulb 3 provided in the backlight apparatus 10B generates heat with luminescence. Especially in both ends of the fluorescent light bulb 3 where electrodes are installed, temperature can rise higher than 120 degrees C., when a large electric current is provided in order to obtain a high brightness. For this reason, some conventional solutions provide a rubber holder made of a heat-conductive material at both ends of the fluorescent light bulb 3, such that heat can be dissipated to the holder 7.

Nevertheless, the heat generated by the fluorescent light bulb 3 cannot be sufficiently dissipated by the holder 7 via the rubber holder, causing lowering of the brightness of the fluorescent light bulb 3, and breaking of a solder joint that connects the electrode section and wiring. Another solution has been to provide a larger holder 7 for more efficient heat dissipation, however, it causes dimensions of the LCDs 1A and 1B to become large.

The present invention is made in view of the above-mentioned point, and it aims at offering a backlight apparatus that can efficiently dissipate the heat generated in the luminescent source, and an LCD that employs the backlight apparatus.

SUMMARY OF THE INVENTION

It is a general object of the present invention to provide a backlight apparatus for a liquid crystal display (LCD), and a liquid crystal display therewith that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the backlight apparatus for the LCD, and the LCD therewith particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides, among other means, a proximity section in a holder that holds the luminescent sources, which helps improve heat conductivity for a center part where the luminescent sources are close together, and the temperature is the highest. The proximity section that is close to the luminescent sources has a space on its back side that is used to lay wiring, resulting in space saving. Where there are three or more luminescent sources, one or two centrally positioned luminescent sources that tend to be the hottest are placed closer to the holder than other luminescent sources, such that heat dissipation of the centrally positioned luminescent sources is enhanced, resulting in an improvement of overall heat dissipation efficiency. Since the temperature of two electrode sections toward the ends of each of the luminescent sources tends to be the highest, the distance between the luminescent source and the holder in the longitudinal direction of the luminescent source is made such that the distance is the smallest at the two ends, and the largest at the center. This improves uniformity in brightness of the luminescent source. A supporting component is provided with a projecting section such that the projecting section is thermally connected to a housing such that the heat is dissipated effectively. The housing can provide a concavity to contain the projecting section such that the thermally connecting area is increased, resulting in a higher efficiency of the heat dissipation. A heat-dissipating component can be provided between the supporting component and a light guide board such that the heat dissipation is further improved. The supporting component can be made of an insulating material such that a high electric current flowing into the luminescent source is not discharged externally. Providing a projecting section to the insulating material further suppresses undesired electric discharge.

The LCD of the present invention employs the backlight apparatus of the present invention, resulting in a reliable product that delivers satisfactory image display at a high brightness, due to the high efficiency of the heat dissipation.

BRIEF DESCRIPTION OF THE DRAWINGS

FIG. 4 shows an expanded view of a portion indicated by an arrow A2 in FIG. 3;

FIG. 14 is a perspective diagram showing an expanded view of the main part of the backlight apparatus of the fifth embodiment of the present invention (No. 3);

DESCRIPTION OF THE PREFERRED EMBODIMENTS

In the following, embodiments of the present invention will be described with reference to the accompanying drawings.

Figure 1:
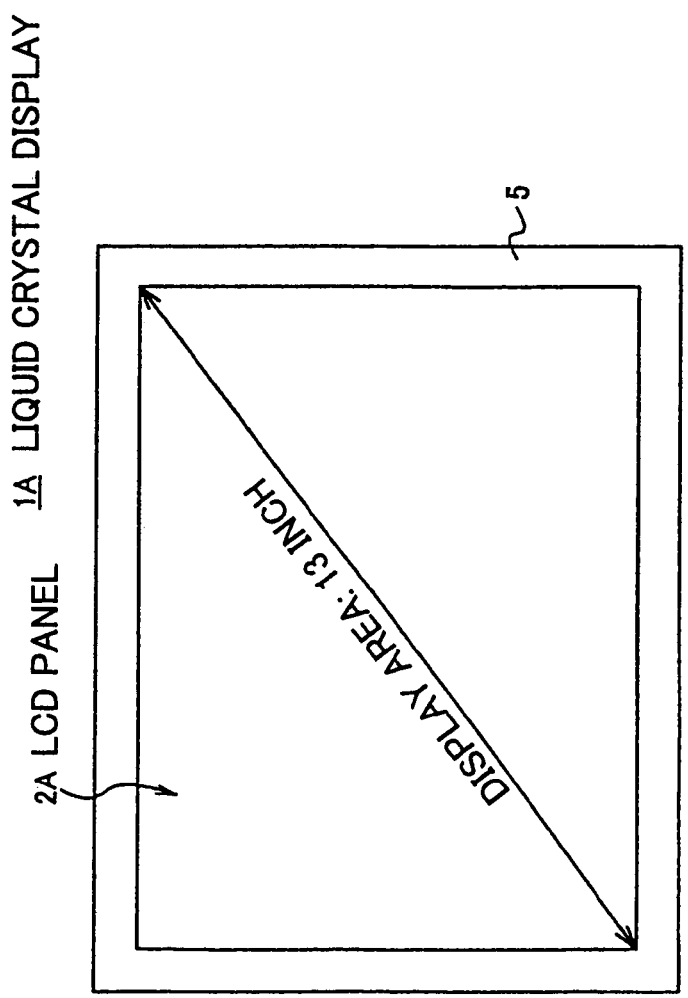
FIGS. 1A and 1B are figures for explaining an LCD having a small screen size, which is provided with a conventional backlight apparatus.
Figure 2:
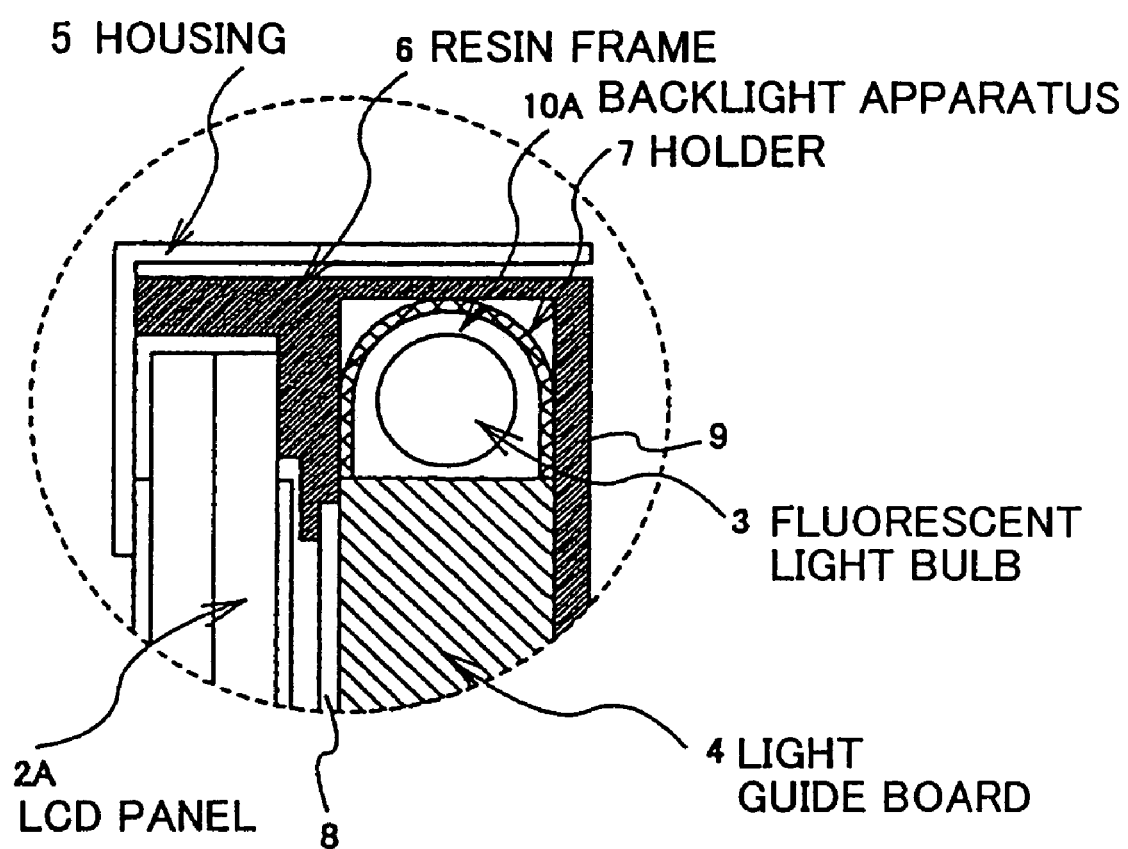
FIG. 2 shows an expanded view of a portion indicated by an arrow A1 in FIG. 1.
Figure 3B:
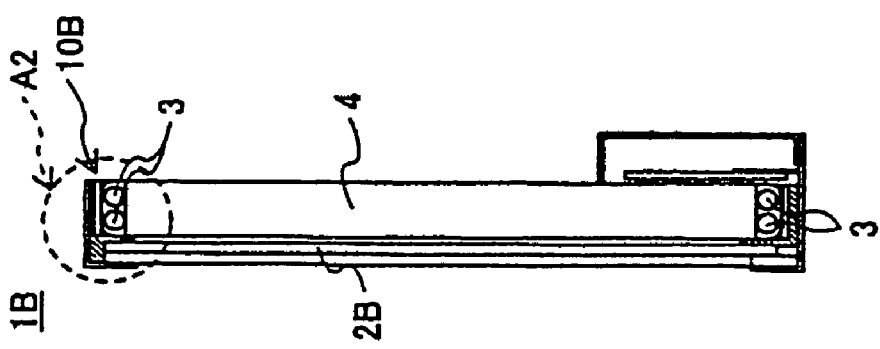
FIGS. 3A and 3B are figures for explaining an LCD having a large screen size, which is provided with a conventional backlight apparatus.
Figure 3A:
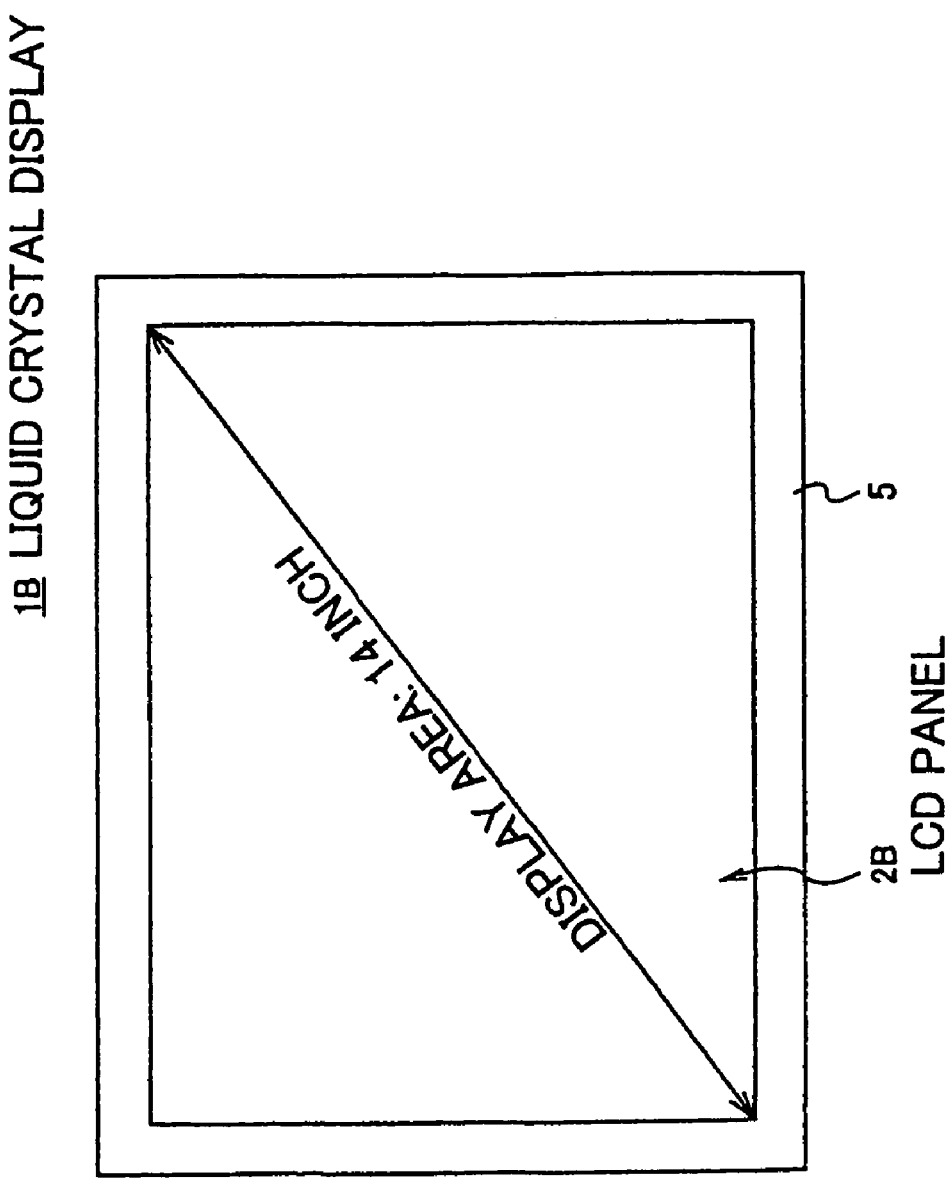
Figure 5:
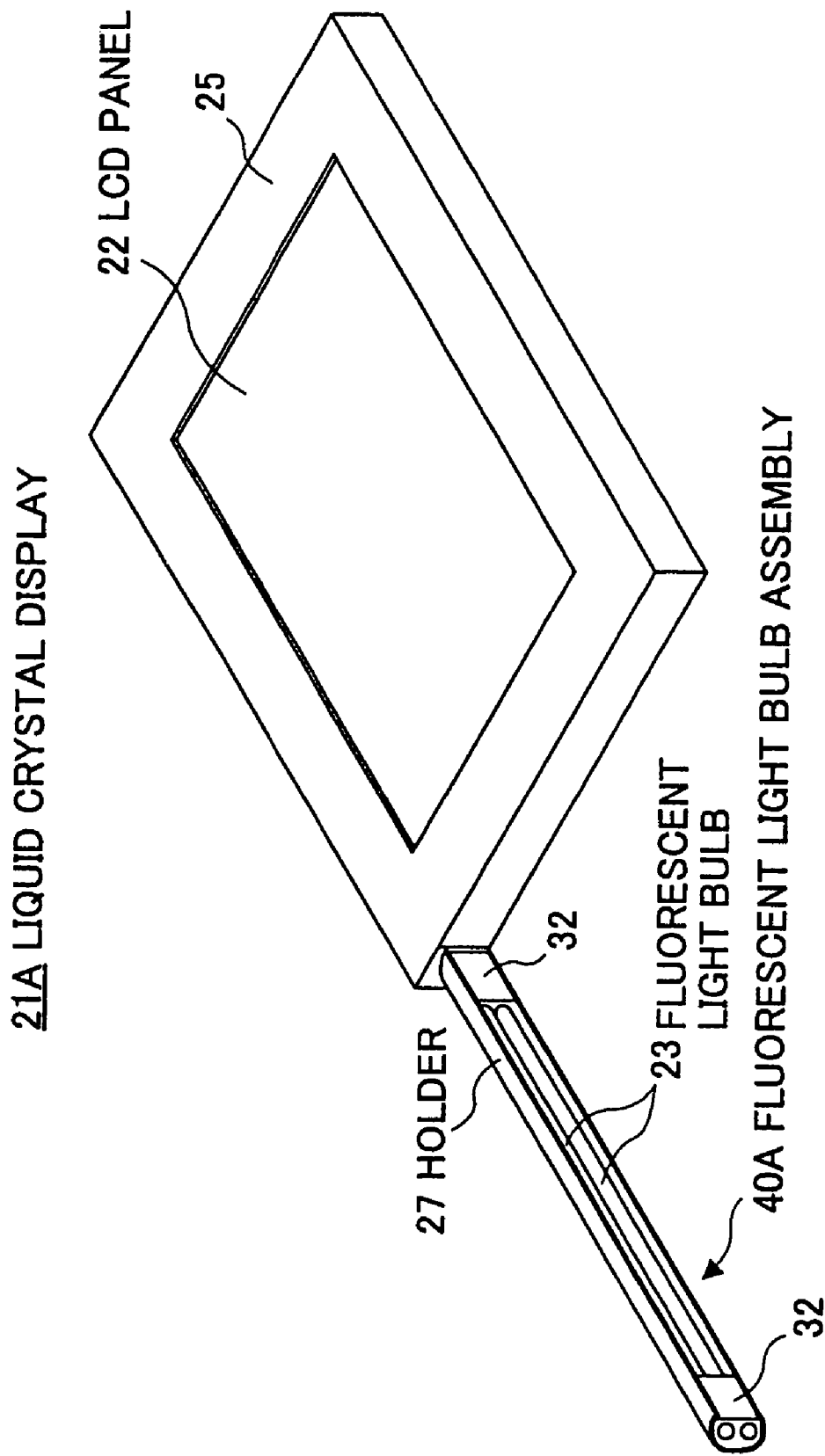
FIG. 5 is a perspective diagram showing an LCD and backlight apparatus of a first embodiment of the present invention.

A first embodiment will be described referring to FIG. 5 and FIG. 6 that show a backlight apparatus 20A, and an LCD 21A using the backlight apparatus 20A of the first embodiment of the present invention. The LCD 21A includes a liquid crystal panel 22, a housing 25, etc. in addition to the backlight apparatus 20A. The housing 25 has a resin frame 26 inside, which holds the liquid crystal panel 22. Further, a backboard 29 is provided at a lower part of the resin frame 26, and the backlight apparatus 20A is arranged between the backboard 29 and the housing 25.

The backlight apparatus 20A gives predetermined brightness to the display of the liquid crystal panel 22 by illuminating the liquid crystal panel 22 from the back. The backlight apparatus 20A includes a light guide board 24 and a fluorescent light bulb assembly 40A. Further, the fluorescent light bulb assembly 40A includes a fluorescent light bulb 23, a holder 27, a rubber holder 32, and wiring 33. In addition, the fluorescent light bulb assembly 40A is arranged such that it can be detached from and attached to the main part of the backlight apparatus 20A in order to facilitate maintenance service.

The fluorescent light bulb 23 is a cold cathode tube serving as a luminescent source. In the present embodiment, two fluorescent light bulbs 23 are included in the fluorescent light bulb assembly 40A. In the glass tube of the fluorescent light bulb 23, mercury, Ar gas, and Ne gas are contained, and a fluorescent material is applied to the wall of the glass tube.

Inside each fluorescent light bulb 23, an electrode section 31 (not shown in FIG. 5, but shown in FIG. 15) is provided at each end. Wiring 33 (not shown in FIG. 5, but shown in FIG. 10) that is connected to the electrode section 31 is pulled out.

Figure 15:
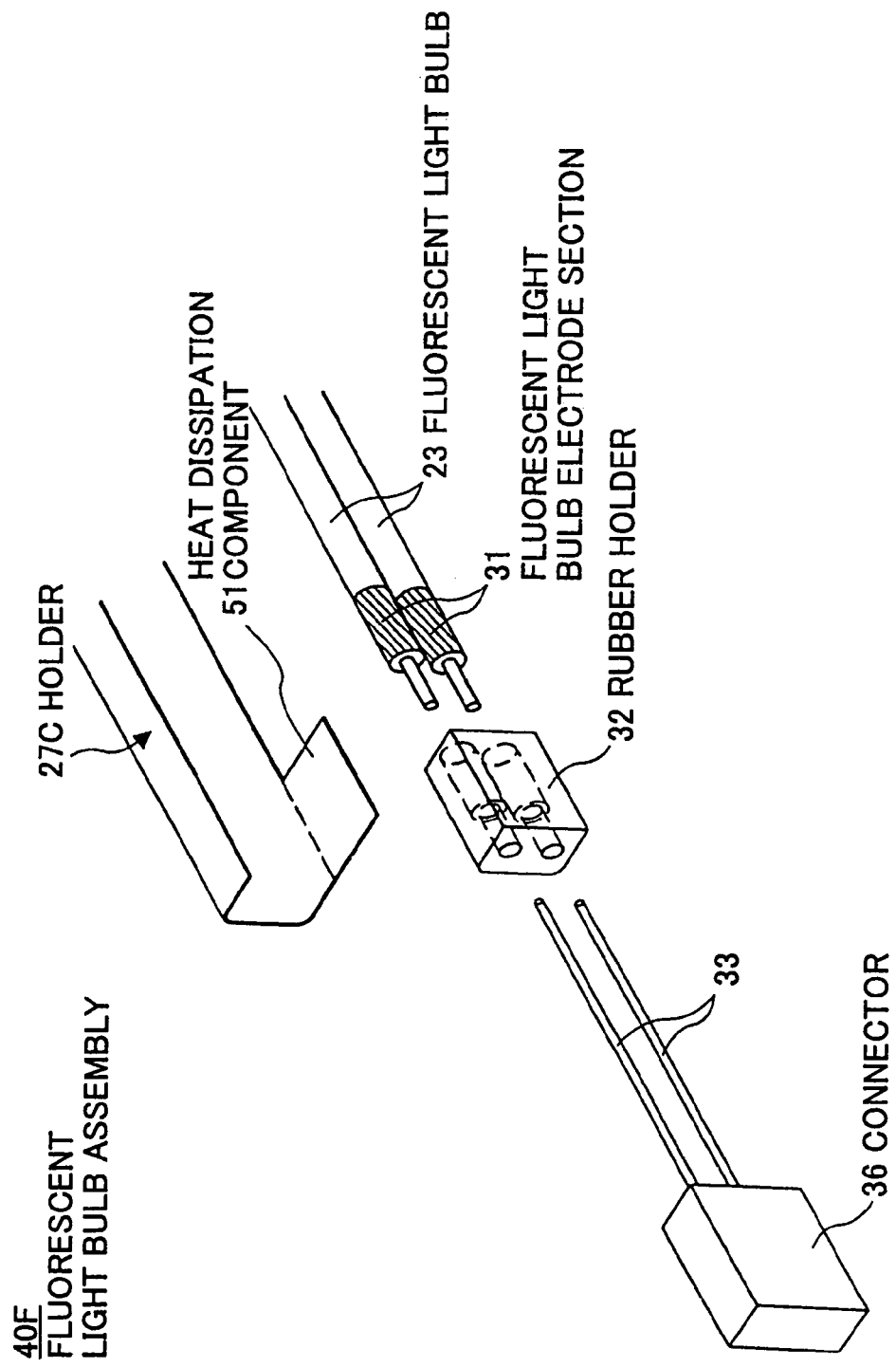
FIG. 15 is an exploded and perspective diagram showing a main part of a fluorescent light bulb assembly prepared in the LCD and backlight apparatus of the sixth embodiment of the present invention.

Although an electrode section 31 is arranged on each end of the fluorescent light bulb 23, as shown in FIG. 15, the wiring 33 is pulled out only from one side, and connected to a connector 36. Therefore, the wiring 33 includes a short pair of wires that connects the electrode section 31 nearer to the connector 36, and a long pair of wires that connects the other electrode section 31 that is farther from the connector 36. The long pair of the wires 33 connected to the electrode section 31 on the far end is pulled out in the same direction as the short pair of wires 33, running along the backside of the holder 27 as shown in FIG. 6.

When electricity is applied to the wiring 33, the electrode section 11 discharges, and mercury gas generates ultraviolet rays, which hit the fluorescent material, resulting in emission of light. The fluorescent light bulb 23 further includes a rubber holder 32, provided on the both ends of fluorescent light bulb 23. The holder 27 holds the fluorescent light bulb 23 through the rubber holder 32.

The holder 27 is made from mainly metal materials such as SUS, steel, and aluminum, and is arranged in the longitudinal direction of the fluorescent light bulb 23. A silver vacuum evaporation layer or a white reflective layer is formed on a face of the holder 27, the face facing the fluorescent light bulb 23 such that the light from the fluorescent light bulb 23 is reflected efficiently. In this manner, the light of the fluorescent light bulb 23 is efficiently guided to the light guide board 24, without diffusing. Further, this holder 27 serves also as a heat dissipation component that radiates heat generated by the fluorescent light bulb 23, as described later.

The rubber holder 32 is made of silicone rubber, for example, in which high conductive metal powder is mixed as filler, providing high heat conductivity. The rubber holder 32 is provided at a position corresponding to each electrode section 11 of the fluorescent light bulb 23. The rubber holder 32 also serves to hold the fluorescent light bulb 23 to the holder 27 as mentioned above. Further, the rubber holder 32 is thermally connected to the holder 27 by being attached to the holder 27.

The light guide board 24 is made of a transparent resin, such as acrylic resin. The light guide board 24 is arranged to face the back of the liquid crystal panel 22. Further, as shown in FIG. 6, the fluorescent light bulb 23 is arranged to face the side of the light guide board 24, i.e., light injecting side.

The optical sheet 28 is arranged in the front side of the light guide board 24 that is, the side that faces the liquid crystal panel 22. The optical sheet 28 condenses and spreads the light emitted from the light guide board 24, such that the light is efficiently provided to the liquid crystal panel 22. Further, a reflective sheet 30 is arranged on the backside of the light guide board 24. The reflective sheet 30 reflects that portion of the light that leaks from the light guide board 24, and returns the leaking light to the interior of the light guide board 24.

Figure 6:
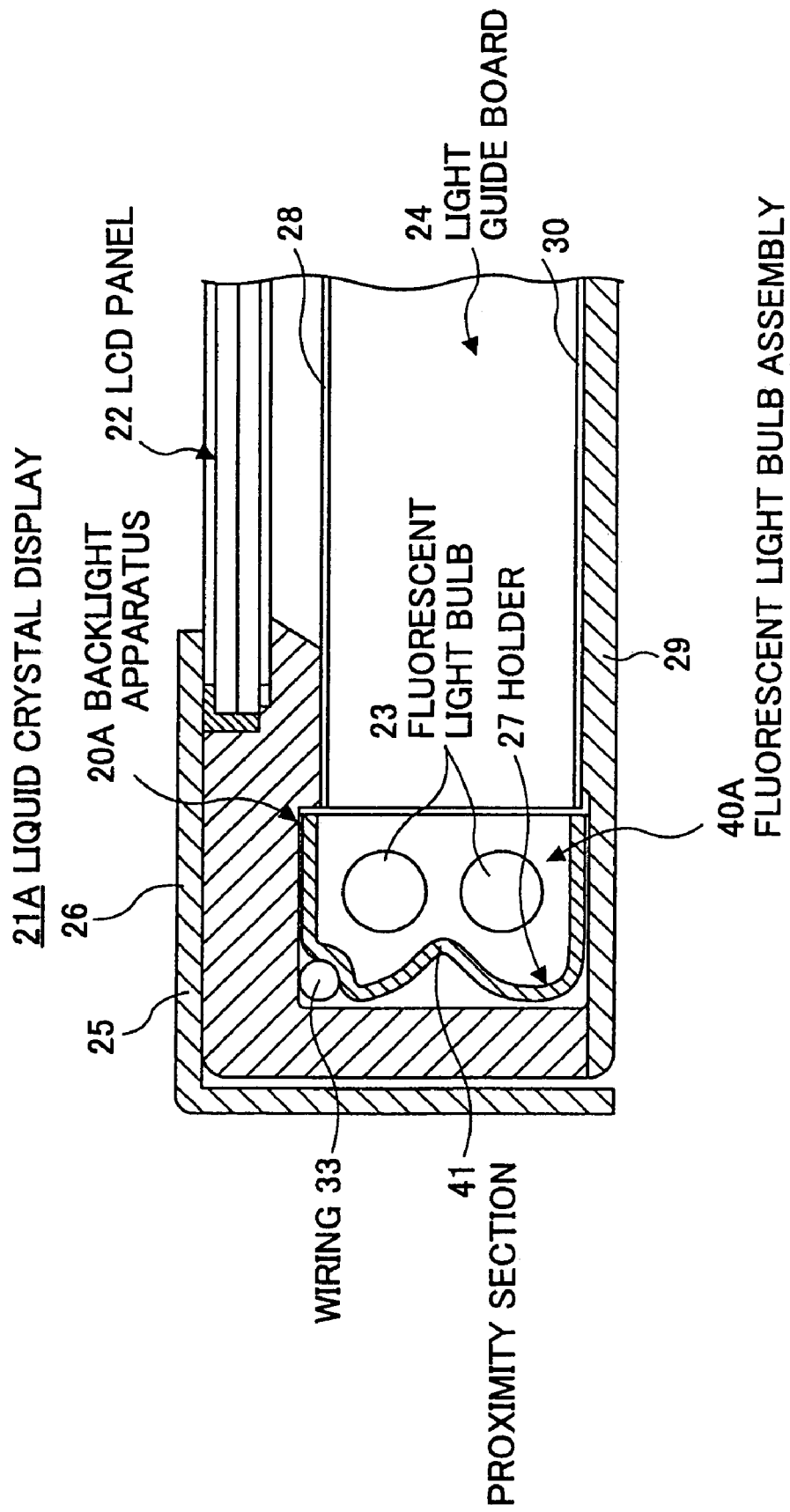
FIG. 6 is a sectional drawing showing a main part of the LCD and backlight apparatus of the first embodiment of the present invention.

Next, an explanation follows about a structure of the holder 27 that serves as a main part of the present embodiment with reference to FIG. 6. The holder 27 of the present embodiment is characterized by providing a proximity section 41 at a location in the proximity of the fluorescent light bulb 23 (luminescent source).

The proximity section 41 is formed by press processing the holder 27, and, therefore, can be formed simultaneously with fabrication of the holder 27. For this reason, manufacturing and assembling of the backlight apparatus 20A do not become complicated even if the proximity section 41 is formed in the holder 27.

By the way, the position where temperature rises the most caused by heat generated by the fluorescent light bulbs 23 in the fluorescent light bulb assembly 40A is where the fluorescent light bulbs 23 face each other, i.e., the position where each fluorescent light bulb 23 adjoins the other fluorescent light bulbs 23. The present embodiment provides the proximity section 41 in the holder 27 at the position where the temperature rises the most, the proximity section 41 facing the fluorescent light bulbs 23.

By the structure as described above, the distance between the fluorescent light bulb 23 and the holder 27 becomes small, which increases efficiency of heat dissipation of the heat generated by the fluorescent light bulb 23 through the proximity section 41 and the holder 27. In this manner, the temperature rise of the fluorescent light bulb 23 is reduced. Especially, as mentioned above, since the proximity section 41 absorbs the heat of the part where the temperature rises the most due to the heat generated by the fluorescent light bulb 23, and radiates the heat through the holder 27, decrease in brightness of the fluorescent light bulb 23 due to heat is minimized. Further, by performing heat dissipation as mentioned above, the temperature rise of the light guide board 24 by the fluorescent light bulb 23 is suppressed, which prevents deformation and fusion that may otherwise occur in the light guide board 24.

Further, since the heat generated by the fluorescent light bulb 23 is dissipated efficiently by the backlight apparatus 20A of the present embodiment, high brightness is realized. Therefore, according to LCD 21A using this backlight apparatus 20A, high reliability is realized while a good picture display of high brightness is provided.

Although the backlight apparatus 20A having two fluorescent light bulbs 23 is explained above as an example, the present invention can apply to a backlight apparatus having any number of fluorescent light bulbs 23, the number including 1 and 3.

Further, although the proximity section 41 is provided nearby a middle point of the two fluorescent light bulbs 23 in the present embodiment, when the temperature distribution in a fluorescent light bulb assembly is known, it is effective to form the proximity section 41 near the part where the temperature becomes the highest.

Next, a second embodiment of the present invention is explained.

Figure 7:
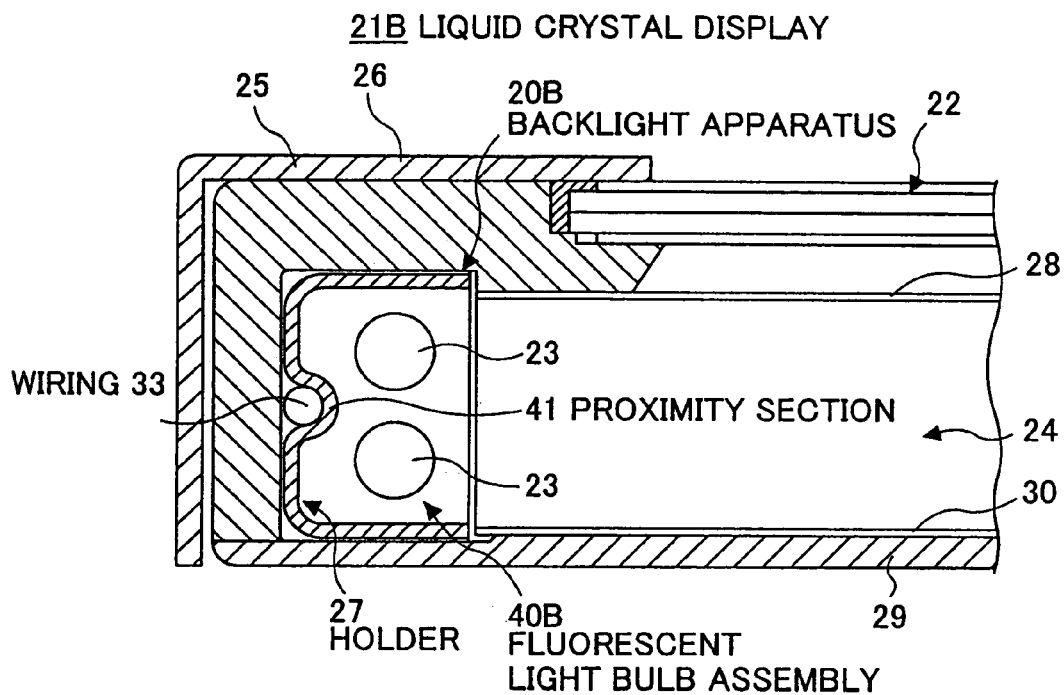
FIG. 7 is a sectional drawing showing a main part of the LCD and backlight apparatus of a second embodiment of the present invention.

FIG. 7 shows a backlight apparatus 20B, and an LCD 21B using the backlight apparatus 20B of the second embodiment. Here, in FIG. 7, about the same components as shown in FIG. 5 and FIG. 6 in the first embodiment, the same reference numbers are attached and the explanation thereof is not repeated. This practice will apply to explanations and drawings of the third embodiment et seq., to be described later.

The proximity section 41 of the backlight apparatus 20B of the present embodiment is formed in a middle position of the pair of fluorescent light bulbs 23, like the first embodiment, where the temperature becomes the highest in the fluorescent light bulb assembly 40B. The second embodiment is characterized by providing the wiring 33 of the fluorescent light bulb 23 on a side of the proximity section 41 other than the side to which the fluorescent light bulb 23 faces. This position will be hereafter called the backside.

As described above, the wiring 33, which includes the short pair of wires and the long pair of wires, connected to the electrode sections 31 is pulled out to the same direction, with the long pair of wires running on the back side of the holder 27. In the present embodiment, the long pair of wires of the wiring 33 provided on the backside of the holder 27 is arranged in the back position of the proximity section 41.

Miniaturization of the backlight apparatus 10B is attained by this configuration. That is, as mentioned above, since the proximity section 41 is formed close to the high-temperature part of the fluorescent light bulbs 23, a space becomes available in the backside position. Compared with a configuration that arranges this wiring 33 in other parts, miniaturization of the backlight apparatus 20B can be attained because the space is available for arranging the long pair of wires of the wiring 33 that is connected to the electrode section 31.

Although the proximity section 41 gets heated while dissipating the heat generated by the fluorescent light bulbs 23, a heat-resistant material is used as a covering material of the wiring 33. In this manner, metal lines of the wiring 33 are not exposed by the covering material melting due to high temperature.

Next, the third embodiment of the present invention is explained.

Figure 8:
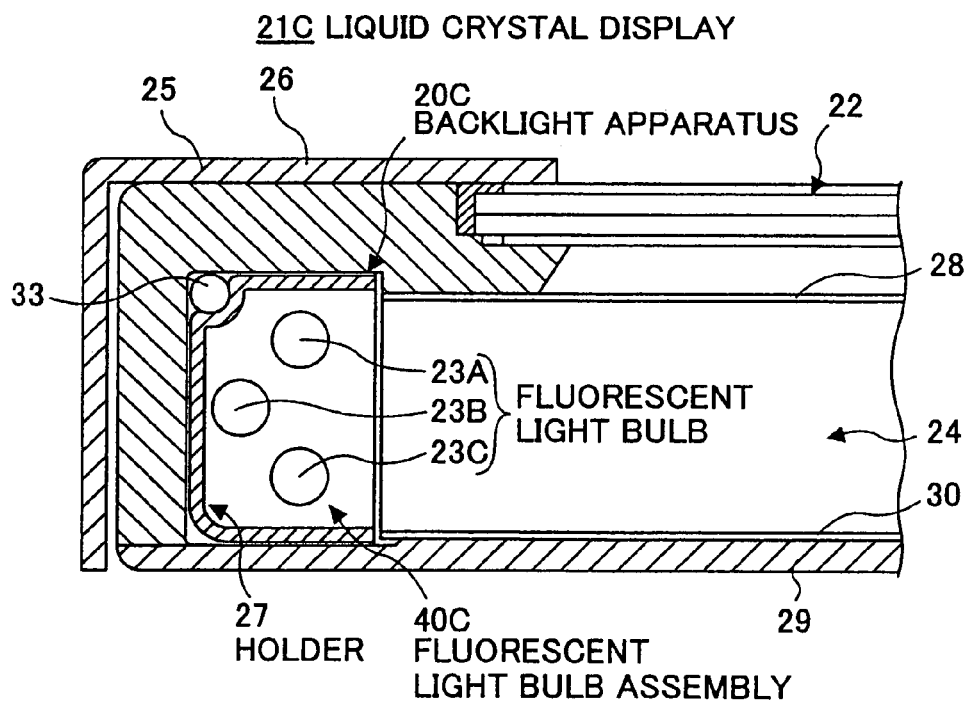
FIG. 8 is a sectional drawing showing a main part of the LCD and backlight apparatus of the third embodiment of the present invention.

FIG. 8 shows a backlight apparatus 20C, and an LCD 21C using the backlight apparatus 20C of the third embodiment of the present invention.

The backlight apparatus 20C of the third embodiment includes three fluorescent light bulbs 23 (designated 23A, 23B, and 23C), in order to attain high brightness. As shown in FIG. 8, the fluorescent light bulb 23B is provided in the middle of the three fluorescent light bulbs 23A, 23B, and 23C. The present embodiment is characterized by having arranged the fluorescent light bulb 23B closer to the holder 27 than the other fluorescent light bulbs 23A and 23C. Positions of the fluorescent light bulbs 23A, 23B, and 23C can be relatively easily determined by arranging supporting holes for the fluorescent light bulbs 23A, 23B, and 23C, which are formed on the holder 27.

By the way, when three or more fluorescent light bulbs are provided, the fluorescent light bulb located in the middle has the most intense temperature rise. In the configuration of the present embodiment that uses the three fluorescent light bulbs 23A, 23B, and 23C, the temperature of the fluorescent light bulb 23B located in the middle becomes the highest.

Accordingly, in the present embodiment, the fluorescent light bulb 23B is placed near the holder 27. In this manner, the heat of the fluorescent light bulb 23B is better dissipated than other fluorescent light bulbs 23A and 23C. In this manner, the heat generated by the fluorescent light bulb 23B is efficiently dissipated through the holder 27. As the result, the temperature rise of the whole backlight apparatus 20C can be suppressed.

Although a configuration of the fluorescent light bulb assembly 40C is described as including the three fluorescent light bulbs 23A, 23B, and 23C in the present embodiment, the present invention can be applied to a fluorescent light bulb assembly having four or more fluorescent light bulbs.

Next, the fourth embodiment of the present invention is explained.

Figure 9:
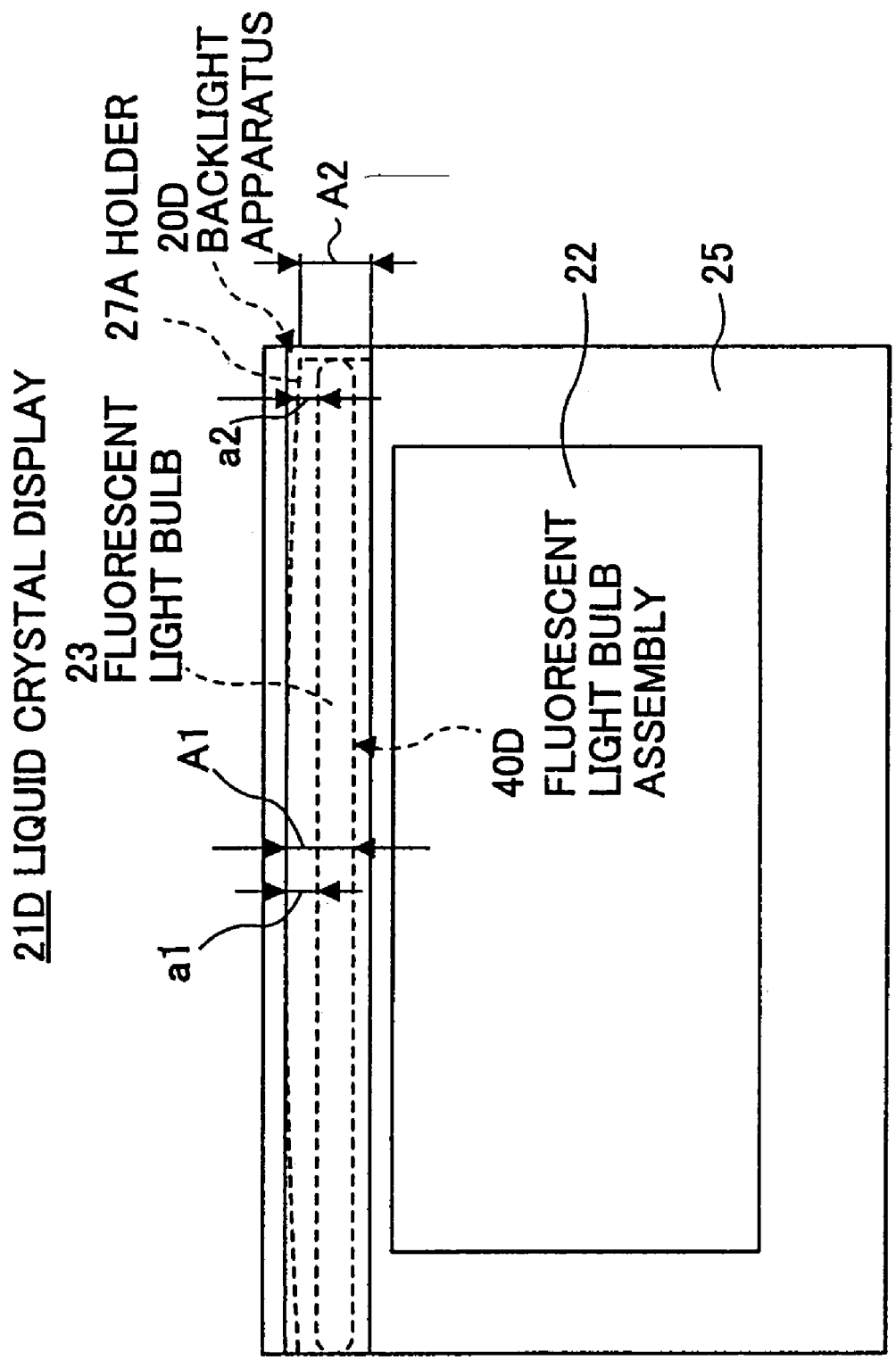
FIG. 9 is a plan showing the LCD and backlight apparatus of the fourth embodiment of the present invention.

FIG. 9 shows a backlight apparatus 20D, and an LCD 21D using the backlight apparatus 20D of the fourth embodiment. The present embodiment is characterized by a tapering shape of the space between the holder 27A and the fluorescent light bulb 23, which are included in the fluorescent light bulb assembly 40D. The space is the widest at the center of the fluorescent light bulb 23, and decreases in width toward each end (henceforth both-end positions) of the fluorescent light bulb 23, where the electrode section 31 is formed.

Specifically, since the diameter size of the fluorescent light bulb 23 is uniform over its longitudinal direction, the holder 27 is structured such that the space at the both-end positions is set small (A2 in FIG. 9), while the space at the center is set large (A1 in FIG. 9). By employing this structure, the space between the fluorescent light bulb 23 and holder 27A at the both-end positions is set at a2, and the space between the fluorescent light bulb 23 and the holder 27A at the center is set at a1, where a1>a2.

According to the structure described above, efficiency of heat dissipation is heightened at the both-end positions, in comparison with the center. As a result, heat distribution is made relatively uniform over the longitudinal direction of the fluorescent light bulb 23, realizing relatively uniform distribution of brightness of the backlight apparatus 20D.

Another advantage of the above structure is that inserting into and removing the fluorescent light bulb assembly 40D from the housing 25 is facilitated. That is, in the backlight apparatus 20D of the present embodiment, the fluorescent light bulb assembly 40D has the smaller dimension a2 at the both ends (namely, both ends of the holder 27A) than the center part, and the size of a hole prepared in the housing 25, into which the fluorescent light bulb assembly 40D is inserted, is made to accept the larger dimension a1, which is larger than a2.

As above, it is easy to insert the smaller end of the fluorescent light bulb assembly 40D into the insertion hole of the housing 25, which is made the larger.

Next, the fifth embodiment of the present invention is explained.

FIG. 10, FIG. 11, FIG. 12 and FIG. 13 show a backlight apparatus 20E, and an LCD 21E using the backlight apparatus 20E of the fifth embodiment.

Figure 10:
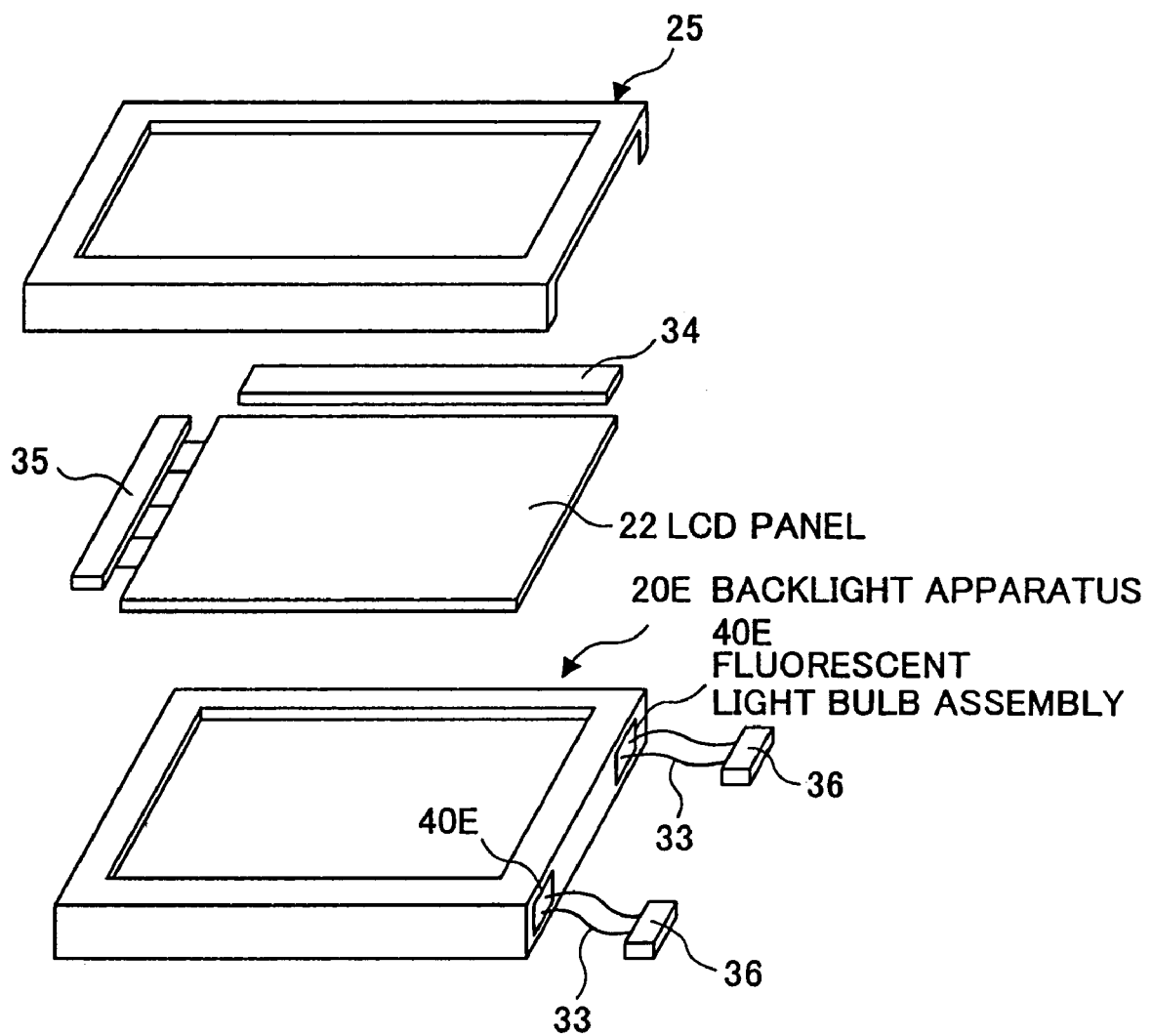
FIG. 10 is an exploded and perspective diagram showing the LCD of the fifth embodiment of the present invention.

FIG. 10 is an exploded and perspective diagram of the LCD 21E of the fifth embodiment. As shown in FIG. 10, the LCD 21E of the present embodiment provides the liquid crystal panel 22 on the backlight apparatus 20E, with the housing 25 provided on the top. Further, the structure is such that the fluorescent light bulb assembly 40E is inserted into and removed from the backlight apparatus 20E. In addition, a data substrate 34 and a gate substrate 35 are provided on separate sides of the liquid crystal panel 22.

Figure 11:
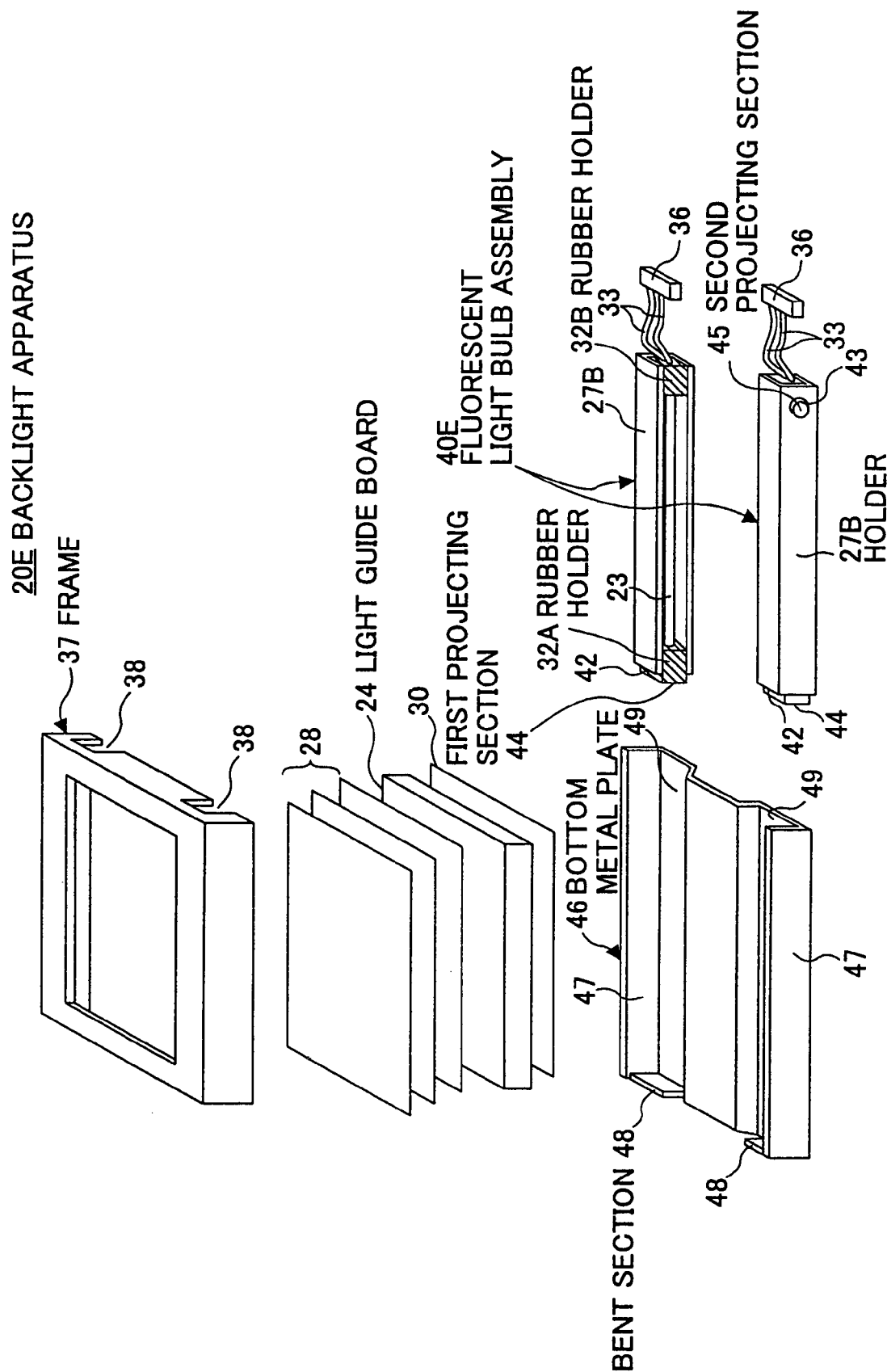
FIG. 11 is an exploded and perspective diagram showing the backlight apparatus of the fifth embodiment of the present invention.

FIG. 11 is an exploded and perspective diagram expanding and showing the backlight apparatus 20E.

The backlight apparatus 20E of the present embodiment includes a light guide board 24, an optical sheet 28, and a reflective sheet 30 that are contained in a housing (case) structured by a frame 37 located in the upper part, and a bottom metal plate 46 located in the lower part. Further, a fluorescent light bulb assembly 40E is also contained in the housing. For this reason, an insertion concavity 38 is formed in the frame 37, and a guiding concavity 49 is formed in the bottom metal plate 46.

Furthermore, a bent section 48 is formed in an end section of the guiding concavity 49 of the bottom metal plate 46. The bent section 48 is structured as a part of the bottom metal plate 46, forming one body, and is simultaneously formed when the guiding concavity 49 and a side plate 47 are formed. Here, as a material for the bottom metal plate 46, a metal material with high thermal conductivity is selected.

Figure 12:
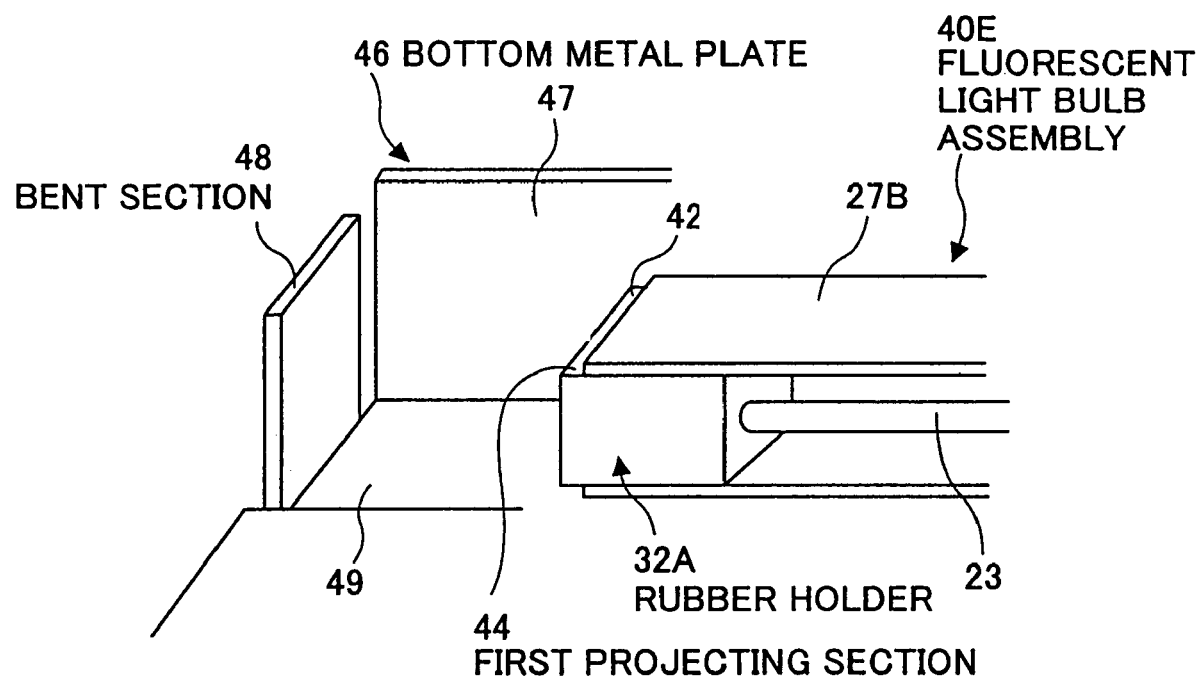
FIG. 12 is a perspective diagram showing an expanded view of a main part of the backlight apparatus of the fifth embodiment of the present invention (No. 1)

Details will be described about an end of the fluorescent light bulb assembly 40E, the end being the first part inserted into the housing. The end is the left-hand side end of the fluorescent light bulb assembly 40E in FIG. 11. As shown in FIG. 12, the fluorescent light bulb assembly 40E of the present embodiment includes a fluorescent light bulb 23, a holder 27B, and a rubber holder 32A. Here, the structure is such that the rubber holder 32A that holds the fluorescent light bulb 23 to the holder 27B projects from an edge 42 of the holder 27B (toward the bent section 48). The part that projects from the edge 42 of the rubber holder 32A is hereafter called a first projecting section 44.

Figure 13:
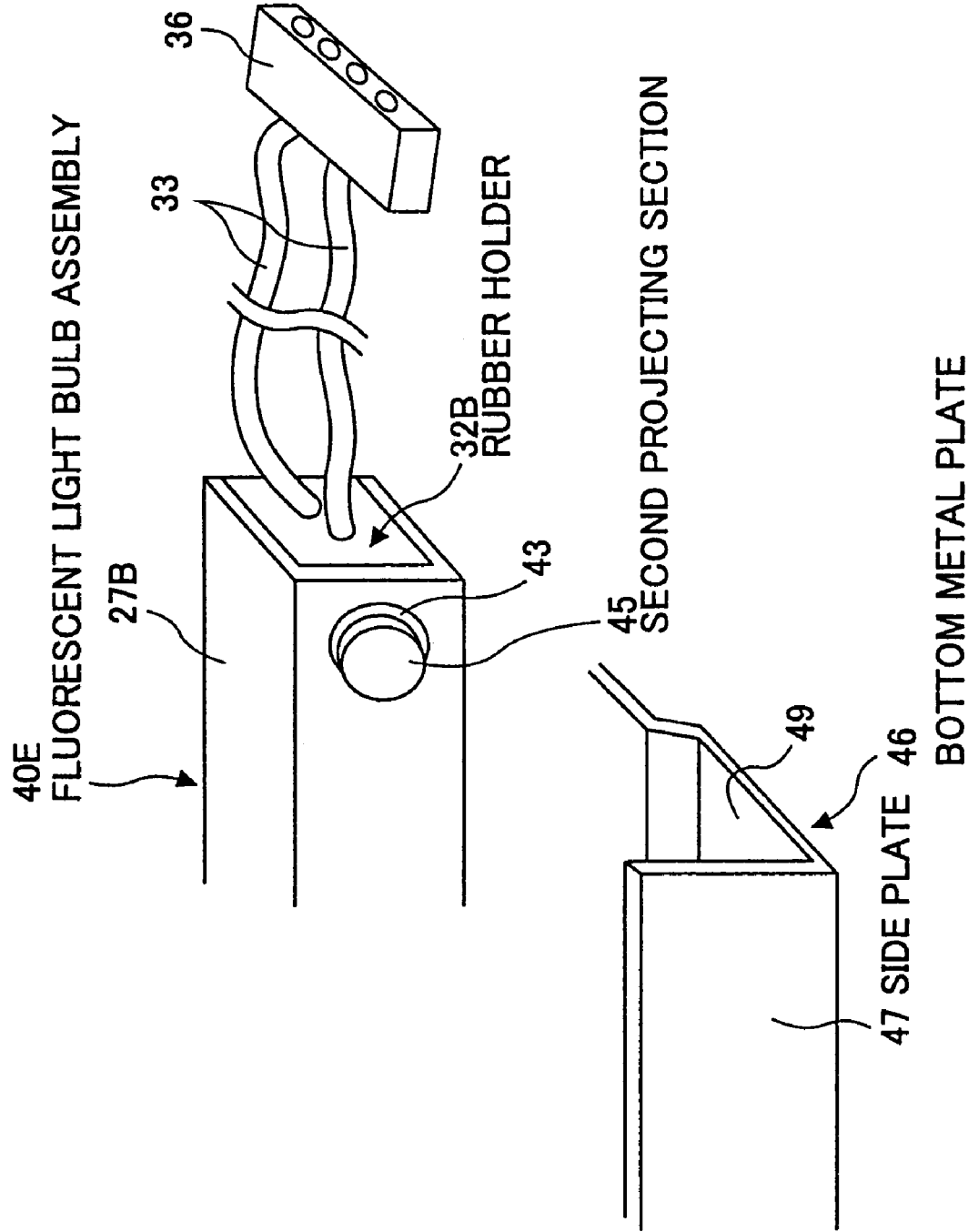
FIG. 13 is a perspective diagram showing an expanded view of the main part of the backlight apparatus of the fifth embodiment of the present invention (No. 2)

On the other side of the fluorescent light bulb assembly 40E, with reference to FIG. 13 (reverse angle), a through hole 43 is formed on the holder 27B, such that the through hole 43 faces the side plate 47 (a part of the bottom metal plate 46). A part of a rubber holder 32B projects from the through hole 43. The projected part is called a second projecting section 45.

In the backlight apparatus 20E that is structured as above, when the fluorescent light bulb assembly 40E is inserted to a predetermined position in the housing constituted by the frame 37 and the bottom metal plate 46, the first projecting section 44 is thermally connected by contacting the bent section 48 formed in the bottom metal plate 46. Further, the second projecting section 45 is thermally connected to the side plate 47 of the bottom metal plate 46.

In this manner, the heat generated by the fluorescent light bulb 23 is dissipated by the bottom metal plate 46 through the first and the second projecting sections 44 and 45, and by the holder 27B. Specifically, the rubber holder 32A is thermally connected to the bottom metal plate 46, by the first projecting section 44 contacting the bent section 48 on the left-hand side in FIG. 12. Further, on the other side, the rubber holder 32B is thermally connected to the bottom metal plate 46, by the second projecting section 45 contacting the side plate 47.

As above, the heat generated by the fluorescent light bulb 23 is efficiently dissipated, and the temperature rise of the fluorescent light bulb 23 can be reduced. Especially, because the first projecting section 44 and the second projecting section 45 are arranged at both ends of the fluorescent light bulb 23, where the temperature becomes the highest, the fluorescent light bulb 23 is cooled effectively.

Furthermore, in the present embodiment, the first projecting section 44 provided on the left-hand side edge does not slide on, nor contact with, the side plate 47 when the fluorescent light bulb assembly 40E is inserted, such that the first projecting section 44 does not wear from insertion friction. The second projecting section 45 that is to contact the side plate 47 is provided in a position where the distance to slide on the side plate 47 when being inserted is short, such that wear of the second projecting section 45 by insertion friction is minimized.

Although the second projecting section 45 and the side plate 47 that face each other take a flat shape in the above-mentioned embodiment as shown in FIG. 13, a concavity section 50 may be provided in the side plate 47 at a predetermined position as shown in FIG. 14, such that the second projecting section 45 meets the concavity 50 when the fluorescent light bulb assembly 40E is installed.

The concavity 50 is formed such that the second projecting section 45 is enclosed, as shown by the mark (B) in FIG. 14. In this manner, the area where the second projecting section 45 contacts the concavity 50 becomes large, resulting in a higher heat dissipation efficiency, and suppressing temperature rise of the fluorescent light bulb 23.

Next, the sixth embodiment of the present invention is explained.

Figure 16:
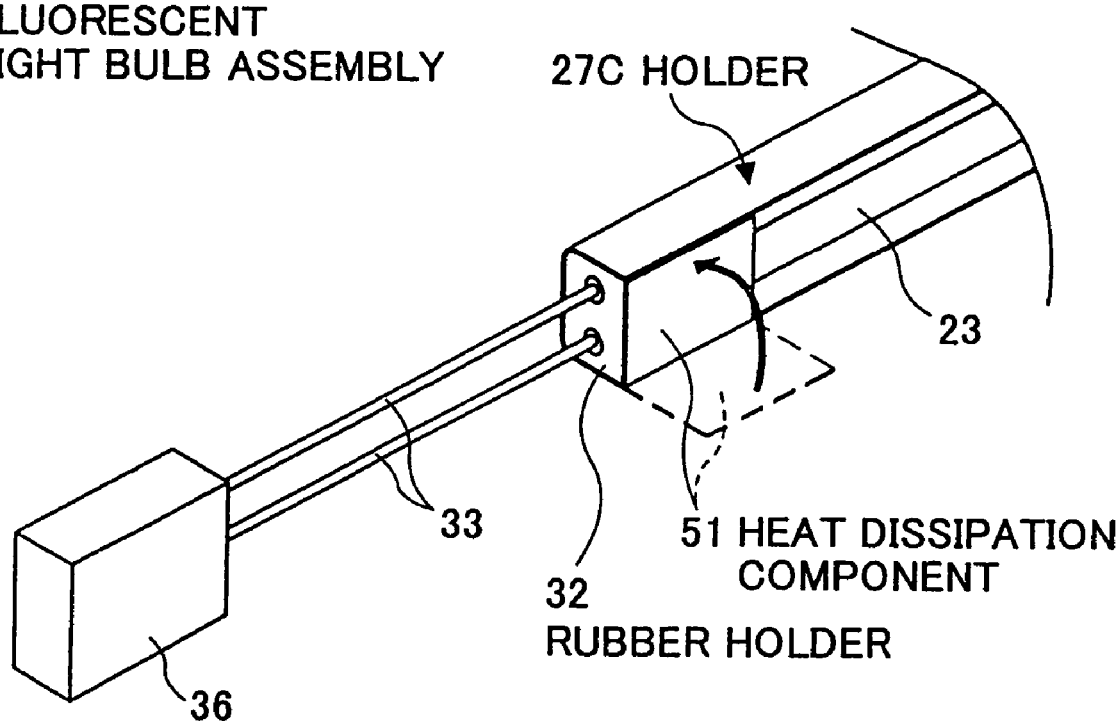
FIG. 16 is a perspective diagram showing a main part of the fluorescent light bulb assembly prepared in the LCD and backlight apparatus of the sixth embodiment of the present invention.
Figure 17:
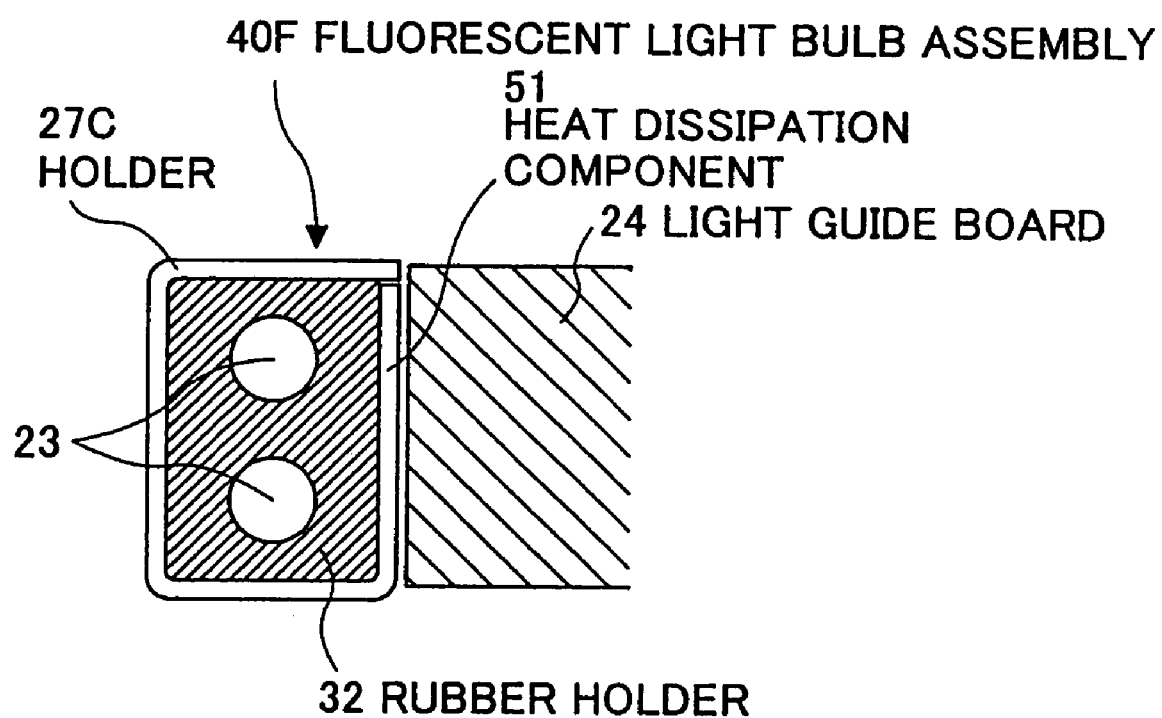
FIG. 17 is a sectional drawing showing a principal part of the fluorescent light bulb assembly prepared in the LCD and backlight apparatus of the sixth embodiment of the present invention.

FIG. 15, FIG. 16 and FIG. 17 show a fluorescent light bulb assembly 40F used in a backlight apparatus and an LCD of the sixth embodiment. The fluorescent light bulb assembly 40F of the present embodiment is characterized by providing a heat dissipating piece 51 between the rubber holder 32 and the light guide board 24, such that the heat dissipating piece 51 is thermally connected with a holder 27C, as shown in FIG. 17.

In the present embodiment, a structure is such that the heat dissipation component section 51 is provided at an edge of the holder 27C in one body, as shown in FIG. 15. Then, the wiring 33 that is beforehand connected to the fluorescent light bulb 23 and a flange 36 is equipped to the rubber holder 32 that is, in turn, installed in the holder 27C, as shown in FIG. 16. Then, the heat dissipation component section 51 is bent and processed in a direction indicated by an arrow, such that the rubber holder 32 is surrounded by the holder 27C and the heat dissipation component section 51. Therefore, when the fluorescent light bulb assembly 40F is installed in the housing (not shown) of the backlight apparatus, the heat dissipation component section 51 comes between the rubber holder 32 and the light guide board 24.

Thus, by providing the heat dissipation component section 51 that is thermally connected with holder 27C between the rubber holder 32 and the light guide board 24, the heat generated by the fluorescent light bulb 23 is not conducted from the rubber holder 32 to the light guide board 24, but is conducted to the holder 27C through the heat dissipation component section 51. In this manner, the light guide board 24 is prevented from being damaged by the heat generated by the fluorescent light bulb 23, and a reliable backlight apparatus is realized.

As mentioned above, in the present embodiment, since the heat dissipation component section 51 is provided in one body with the holder 27C, the number of components does not increase. Further, the one body structure of the heat dissipation component section 51 and the holder 27C contributes to higher heat conductivity from the heat dissipation component section 51 to the holder 27C.

Next, the seventh embodiment of the present invention is explained.

Figure 18:
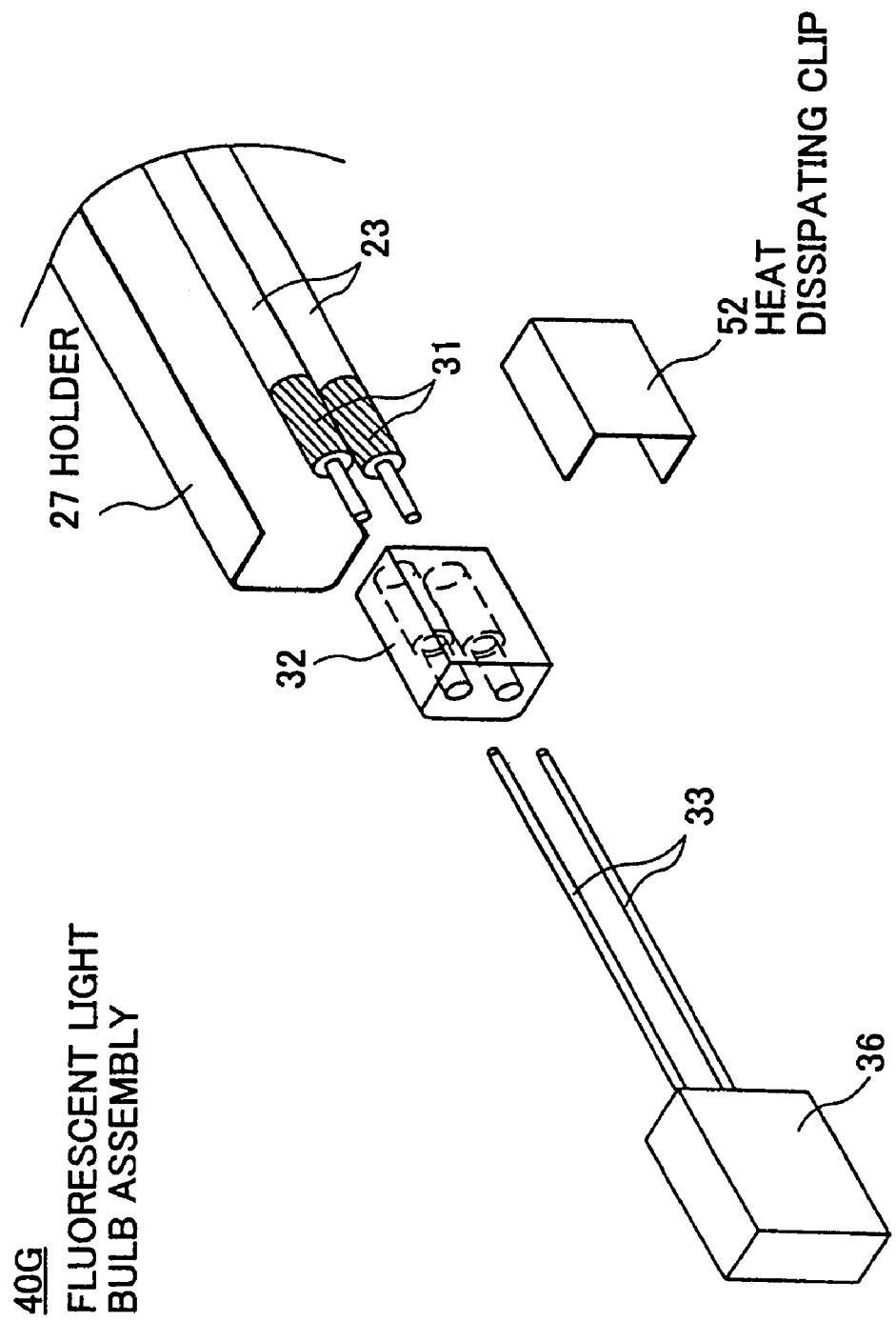
FIG. 18 is an exploded and perspective diagram showing a main part of the fluorescent light bulb assembly prepared in the LCD and backlight apparatus of the seventh embodiment of the present invention.
Figure 19:
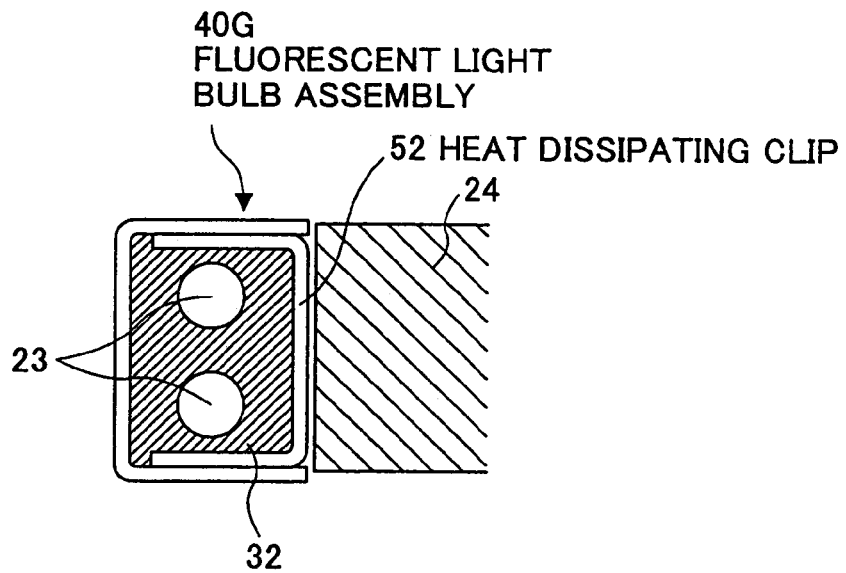
FIG. 19 is a sectional drawing showing a main part of the fluorescent light bulb assembly prepared in the LCD and backlight apparatus of the seventh embodiment of the present invention.

FIG. 18 and FIG. 19 show a fluorescent light bulb assembly 40G used in a backlight apparatus and an LCD of the seventh embodiment.

In the sixth embodiment, the heat dissipation component section 51 is formed in one body with the holder 27C. Here, in the seventh embodiment, a clip component 52, as shown in FIG. 18 and which is called a heat-dissipating clip 52, is employed to help dissipate heat. The heat-dissipating clip 52 is made of a metal material that has high thermal conductivity and elasticity.

Accordingly, the heat-dissipating clip 52 is attachable to and detachable from the holder 27, facilitating assembly and maintenance.

Next, the eighth embodiment of the present invention is explained.

FIG. 20, FIG. 21, FIG. 22, and FIG. 23 show a fluorescent light bulb assembly 40H used by a backlight apparatus and an LCD of the eighth embodiment.

Figure 20:
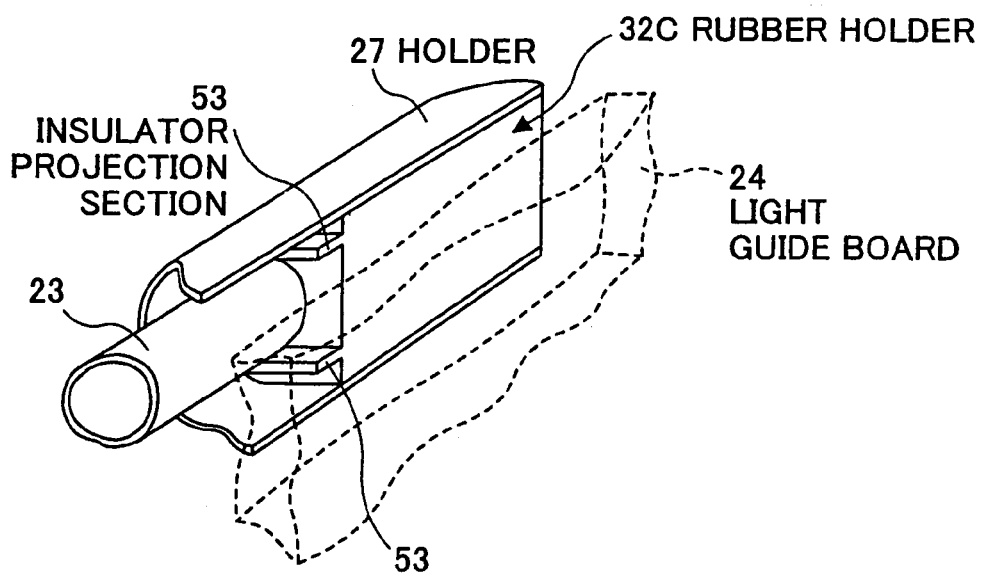
FIG. 20 is a perspective diagram showing a main part of the fluorescent light bulb assembly prepared in the LCD and backlight apparatus of the eighth embodiment of the present invention.
Figure 21:
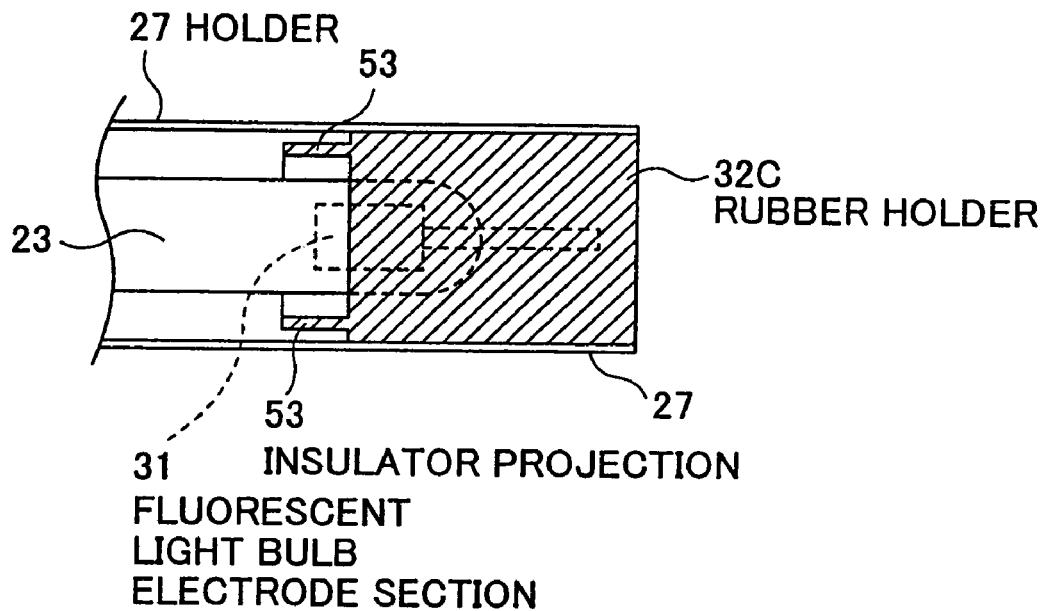
FIG. 21 is a front view showing a main part of the fluorescent light bulb assembly prepared in the LCD and backlight apparatus of the eighth embodiment of the present invention.
Figure 22:
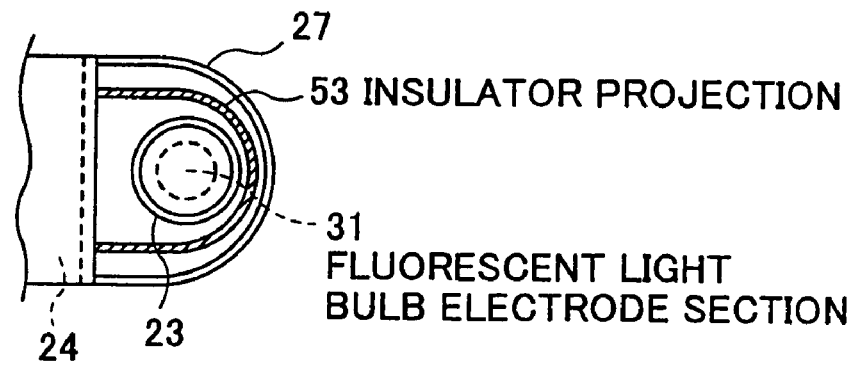
FIG. 22 is a sectional drawing showing a main part of the fluorescent light bulb assembly prepared in the LCD and backlight apparatus of the eighth embodiment of the present invention.
Figure 23:
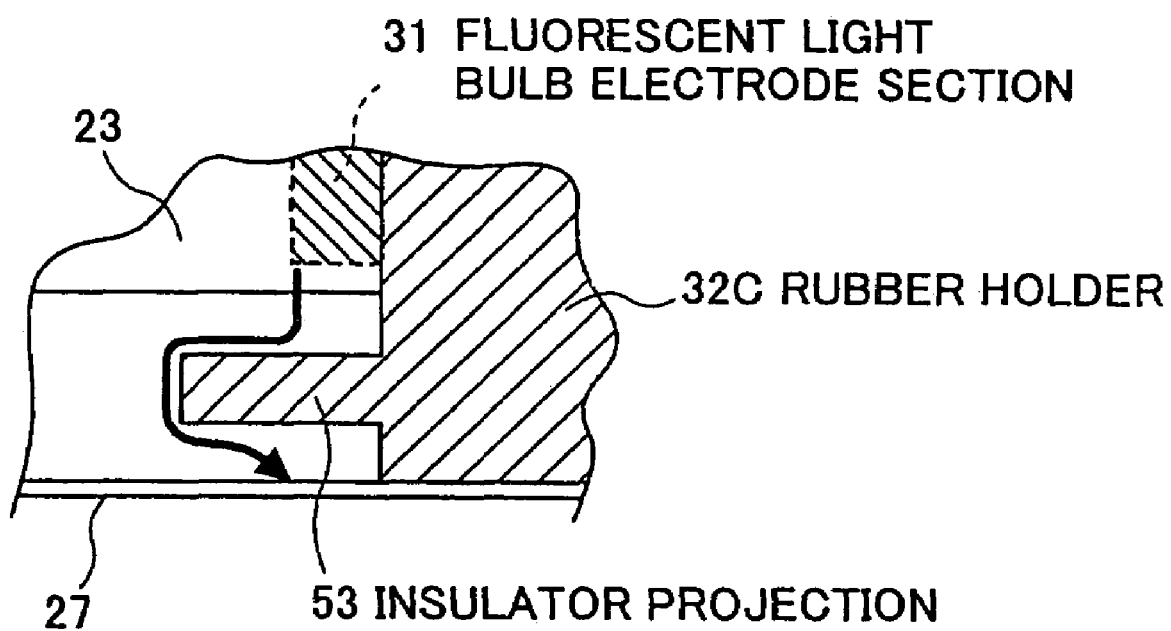
FIG. 23 shows an expanded view near an insulation projection.

The fluorescent light bulb assembly 40H of the present embodiment is structured such that the rubber holder 32C is made of an insulating material, and an insulator projection 53 is provided to the rubber holder 32C. The insulator projection 53 is formed in one body with the rubber holder 32C, and is formed between the electrode section 31 of the fluorescent light bulb 23, and the holder 27, as shown in FIG. 21, FIG. 22, and FIG. 23. Further, the insulator projection 53 is formed only in a position facing the holder 27, and is not formed in a position facing the light guide board 24, as shown in FIG. 20 and FIG. 22.

Here, the holder 27 is made of a metal material as described above, and a large electric current flows through the electrode section 31, generating electric discharge. For this reason, a possibility is that electric discharge may occur between the electrode section 31 and the holder 27. In order to attain high brightness, a large electric current is required, which increases the possibility of external electric discharge occurring. When the external electric discharge occurs, metal particles are affixed to the inner wall of the fluorescent light bulb 23 by sputtering, causing remarkable degradation of the fluorescent light bulb 23, and reliability of the backlight apparatus will fall.

In view of this, the present embodiment provides the insulator projection 53 to the rubber holder 32C that insulates the electrode section 31 from the holder 27. In this manner, a route for the electric discharge to occur becomes long as an arrow shows in FIG. 23, and therefore, occurrence of the electric discharge is suppressed, enhancing safety and reliability of the backlight apparatus.

Further, in the present embodiment, since the insulator projection 53 is provided only in an area where the electric discharge may occur between the electrode section 31 and the holder 27, and where the insulator projection 53 faces the holder 27, the light directed to the light guide board 24 of the fluorescent light bulb 23 is not interrupted. Therefore, even if the insulator projection 53 is provided in order to prevent the electric discharge from occurring, the brightness of the backlight apparatus is not lowered.

According to the present invention, various effects are realized as follows.

By providing the proximity section in the holder, dissipation efficiency of the heat generated by the luminous source is improved.

By providing the space for wiring on the backside of the holder, miniaturization of the backlight apparatus is realized.

By locating the centrally positioned luminescent source elements that tend to be the hottest closer to the holder, temperature rise of the luminescent source as the whole is suppressed, resulting in efficient heat dissipation.

By providing the tapering shape such that the distance between the luminescent source and the holder is the largest at the central point of the luminescent source, and is the smallest at both ends of the luminescent source, relatively uniform heat distribution is attained, and, therefore, relatively uniform brightness of the luminescent source is obtained.

By providing the projecting section to the holder, conductivity of the heat generated by the luminescent source is improved, resulting in enhanced heat dissipation, and suppressing a temperature rise of the luminescent source.

By providing the concavity shape for the projecting section, the contacting area is increased, which further improves heat conductivity, resulting in further ability to suppress the temperature rise of the luminescent source.

By providing the heat dissipation component, dissipation of the heat generated by the luminescent source is enhanced, preventing the light guide board from being damaged, and realizing a reliable backlight apparatus.

By providing the heat dissipation component in one body with the holder, the number of components is minimized.

By providing the heat dissipating clip that is attachable and detachable, assembly and maintenance is facilitated.

By providing the insulator projecting section, external electric discharge between the electrode section of the luminescent source and the holder is suppressed, enhancing safety and reliability of the backlight apparatus.

By providing the insulator projecting section such that the light from the luminescent source is not interrupted, brightness of the backlight apparatus is not lowered.

By using the backlight apparatus of the present invention, an LCD that provides enhanced image quality with high reliability is realized.

Further, the present invention is not limited to these embodiments, but various variations and modifications may be made without departing from the scope of the present invention.

The present application is based on Japanese priority application No. 2001-399592 filed on Dec. 28, 2001 with the Japanese Patent Office, the entire contents of which are hereby incorporated by reference.

What is claimed is:

1. A backlight apparatus of an edge light type, comprising:
at least one luminescent source having an electrode section for conducting electric current,
a light guide board to which the luminescent sources transmit light,
a holder in which the luminescent source is installed,
a supporting component secured to the electrode section of the luminescent source for supporting the luminescent source in the holder, and
a heat-dissipating component thermally connected to the holder and located between the supporting component and the light guide board.

2. The backlight apparatus as claimed in claim 1, wherein the heat-dissipating component is formed in one body with the holder.

3. The backlight apparatus as claimed in claim 1, wherein the heat-dissipating component is attachable to and detachable from the holder, having a clip structure.

4. A liquid crystal display apparatus, comprising:
a liquid crystal panel, and
the backlight apparatus as claimed in claim 1, wherein the luminescent source is provided on a side of the light guide board.

* * * * *